April 13, 1948.  E. F. MARTINEC  2,439,406
GAUGING-DEVICE ACTUATED LIGHT-BEAM RESPONSIVE, SELECTING APPARATUS
Filed March 15, 1943   3 Sheets-Sheet 3

Inventor
Eugene F. Martinec
By Wooster & Davis
Attorneys

Patented Apr. 13, 1948

2,439,406

UNITED STATES PATENT OFFICE 2,439,406

GAUGING-DEVICE ACTUATED LIGHT-BEAM RESPONSIVE SELECTING APPARATUS

Eugene F. Martinec, Cleveland, Ohio

Application March 15, 1943, Serial No. 479,241

31 Claims. (Cl. 209—88)

This invention relates to gauging instruments and may comprise as a unit a completely enclosed device with control circuits enclosed in the unit.

It has for an object to provide a simple and effective device for accurately gauging various parts or elements, and one which can be employed to operate an indicating means, either visible, audible, element sorting or separating, and the like.

It is also an object to provide a device of this character in which the indicating or translating means is controlled by interruption of a light beam which offers no resistance to movement of an element, such as the indicating arm of a gauging means, which is shifted or positioned by the element or part being gauged, so that there is nothing in the controlling means to affect the position determined by the dimensions of the element, and therefore the indicating or translating means will not affect the accuracy of the indication.

Another object is to provide a device of this character which will insure sufficient time in the gauging operation for low-price high inertia translating equipment controlled by said gauging operation to function accurately and positively under all conditions.

It is another object to provide such a device which may be constructed and assembled as a small unit, which may be assembled and adjusted independently of its application and may be mounted as such unit on an application locating support in position for gauging desired parts or elements involved, and at the same time may be used in connection with the device with which it is so located to control operation of such device on the elements to be gauged to maintain them accurately within predetermined small limits.

Another object is to provide a device which can be used for counting the number of measuring units that a part being gauged varies from some given size and also can be used to sort them according to size, and further can be used to accept parts having certain tolerances, or can be used to give any type of signal based on the size of the part being gauged, as well as being able to translate through various means adjustment to the machine producing the parts being gauged, which adjustment depends on the size of the gauged parts.

Still another object is to provide a device of this character in which a simple indicating arm or pointer may be used and thus without increase in weight which would be required if the tip of the indicating arm were widened or increased in size. This is desirable as any unnecessary weight added to the arm, especially at the tip, increases its inertia, causing excessive wear on the gauging mechanism and also slowing down the gauging time.

A further object is to provide a device involving a plurality of controlled circuits in which the correct circuit for connection to translating equipment, depending on the size of the parts being gauged, is selected directly by a scanning shutter arm cooperating with the indicating arm so that no extra stepping or selecting switch is necessary.

Still another object is to provide a construction with which it is possible to have a small sized unit, self-contained, that is capable of selecting the correct circuit to energize translating equipment, said circuit depending on the size of the parts being gauged, and will also provide means to energize automatic feeding and ejecting equipment so that the unit is entirely automatic and requires no attention except the filling of the feeding hopper when necessary.

With the foregoing and other objects in view, I have devised the construction illustrated in the accompanying drawings forming a part of this specification. It is, however, to be understood the invention is not limited to the specific construction and arrangement shown but may employ various changes and modifications within the scope of the invention. These drawings are somewhat diagrammatical, but show the device in sufficient detail that the principles of construction and operation may be readily understood.

Figure 1:
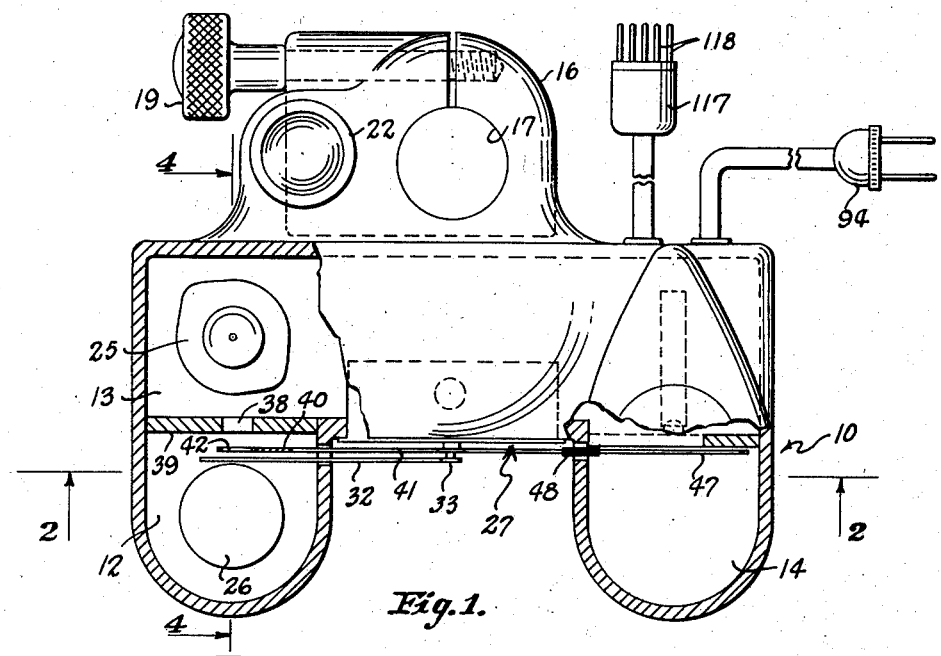
Fig. 1 is a top plan view and partial section of the assembled device or unit.

This invention was developed for the purpose of filling a definite need on the part of industry for gauging equipment capable of not only automatically gauging parts or elements to within .001 inch or less, but which also could be used to automatically grade them and sort them into bins or receptacles according to size. Gauges now largely employed are dependent upon the human element to correctly read the gauge, and then depend on the operator to sort the articles according to such readings in the correct receptacle. The ordinary dial type of gauge is rather difficult to read and becomes extremely tiresome to the operator where a large number of pieces are handled, resulting in liability to error, which tendency increases as the number of pieces handled is increased. In an attempt to remedy this condition several so-called electro-limit gauges and other types of electric gauges have been developed which spread the indication of size over a much larger dial area so as to make them easier for the operator to read. All the electric gauges are extremely critical devices and require considerable setting and maintaining of adjustment, and in addition are quite expensive and complicated. In spite of the larger dial area for any given tolerance provided by these electric type gauges, they are still subject to the human element in correctly reading and sorting the pieces.

To overcome these difficulties and problems I have devised the present construction which will not only automatically register extremely small tolerances, but may also be employed to sort the measured piece into its correct receptacle. In this invention the extremely simple gear type dial gauge, which over a good many years has proved to be extremely durable and accurate, is employed, and there is built around it and assembled therewith in a complete unit, means of translating the reading given by the dial gauge into any amount of energy necessary for correctly indicating the reading or doing any type of feeding, grading, sorting, feed or adjustment control and the like. This has been accomplished without in any way affecting the accuracy, life or simplicity of the dial gauge.

This device makes use basically of the indicator arm or pointer of the dial gauge for interrupting at a given point a beam of light focused on a photocell element associated with a sensitive contact means operated directly by current flowing through the photocell or the use of a suitable stable, simple and economical amplifier, indicated merely diagrammatically but whose operation will be readily understood. No special equipment in the form of special vacuum tubes, relays or other similar equipment is necessary, as standard devices readily available on the market may be employed. As a beam of light offers absolutely no resistance to the passage of a solid through it, it will be understood that this system or device in no way affects the stability and accuracy of the simple dial gauge. The device is so constructed and arranged that no special optical system is required and a standard small incandescent filament type lamp developed for projector use may be employed. All vacuum tubes and relays used may be of standard types produced in large quantities for other purposes and therefore may be readily secured on the market.

This device employs the same fundamental principles of interruption of a light beam to establish or indicate the size of the part being gauged with a scanning shutter cooperating with the indicating arm of the gauging element for interrupting the light beam and controlling the operation of relays or other translating equipment, as described in my co-pending application filed of even date herewith, Serial No. 479,240, now Patent No. 2,397,971, dated April 9, 1946.

This device assures sufficient time for low-price high inertia translating equipment to function accurately and positively under all conditions regardless of the speed of movement of the indicating arm or pointer of the gauging element shifted or positioned by the gauging stem of this element.

The device comprises a small housing 10 made of suitable material, preferably a suitable molded plastic material or a die casting, and may for convenience and simplicity of molding comprise two or more sections secured together, as for example in the present case a body portion 11 having suitable chambers 12, 13 and 14 in which are mounted various elements of the device and some or all of which may open through one side of this body portion of the housing, as for example the top thereof, to facilitate mounting the elements in these chambers and gaining access thereto, and which chambers may be closed by a suitable top or closure section 15. The housing also includes a split lateral extension or frame 16 having an opening 17 therethrough to receive and embrace an application locating post or support 18 and on which it is adjustable to permit location of the housing in a desired position with relation to other elements and to position the indicating arm or pointer of the gauging element at zero or any other point, as determined by a master part, and on which post or support it may be clamped in adjusted position by a clamping screw 19. This post or support 18 might be mounted on an automatic machine, machine tool or other device with which the gauging device is to be used. There is also provided a locking collar 20 also embracing the post or support 18 and split so that it may be clamped in the desired position on this post or support by a similar clamping screw 21. Frame portion 16 is connected to this collar by a micrometer adjusting screw 22 mounted for turning movement in collar 20 but held therein against longitudinal movement, as shown at 22a, and having threaded connection with the housing frame 16. This may be a single or double micrometer screw as desired, and is designed for close micrometer adjustments of the housing with respect to the collar to properly locate the housing and the gauging means carried thereby with respect to the gauging table or support indicated diagrammatically at 23, and permit locating of the device with the indicating arm or pointer of the gauging element at zero position, or if preferred at any other position with respect to a master or standard part or element 24, with which the elements to be gauged are to be compared, as will be more fully described later. The collar 20 may be clamped in the desired position on the post or support 18 and after loosening the clamping screw 19 the housing may be raised or lowered by the micrometer screw 22 to the desired position and then clamped in this position by again tightening or setting the screw 19.

Mounted in the housing, as for example in the light tight chamber 13, is a light sensitive or photocell element 25, and in the adjacent chamber 12 is a light source, such for example as a relatively small incandescent filament electric light element 26 to provide a beam of light to be projected on the cell element 25. Located between the light element and the cell element is means for controlling the effect of the light beam on the cell element, which means is in turn controlled by a means responsive to variations in the dimensions of the elements to be gauged. For this purpose, although various types of gauging or measuring mechanism may be used, I prefer a typical gear type dial gauge 27 which has over a good many years of use proved to be extremely durable and accurate. A satisfactory type of this mechanical gauging element is illustrated somewhat diagrammatically and comprises a movable gauging stem 28 guided for vertical sliding movement and projecting from the housing in position to engage the element to be gauged, such as a master gauge block 24 used for setting the device and the elements to be gauged and compared with this master block, such for example as a circular element indicated diagrammatically at 29 in Fig. 5. It will be understood that this stem need not directly engage the element being gauged but could engage an intervening member whose position is determined by the element so that the position of the stem is determined by this element. An example of such an arrangement is disclosed in my pending application filed of even date herewith, Serial Number 479,243, now Patent No. 2,376,372, dated May 22, 1945. This movable stem 28 is connected by a rack 30 and suitable gearing 31 with an indicating arm 32 pivoted at 33, the gearing being such as to step up or amplify the movement of the stem 28 to give a much larger movement of the indicating arm. This arm may move over a suitable indicating dial 34 and have a zero setting slot 35 or other indicating means to indicate when it is in zero or any other position over the dial. A spring 36 tends to shift the stem 28 downwardly to engage the article being gauged.

Figure 2:
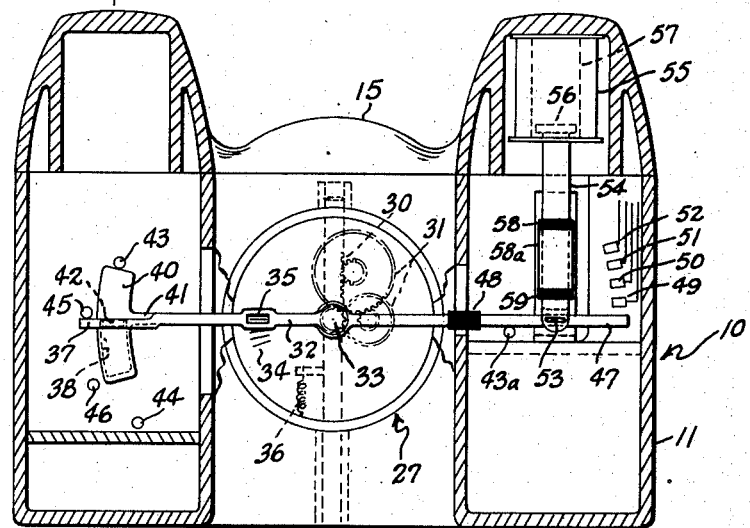
Fig. 2 is a vertical section substantially on line 2—2 of Fig. 1.

The arm 32 is extended to a position between the photocell element and the light element and is provided with a tip or head portion 37 of suitable width positioned to move over an elongated slot 38 in the dividing wall 39 between the chambers 12 and 13 and therefore between the light element 26 and the photocell element 25. Between the head 37 and the dividing wall 39 is a scanning shutter 40 of arc shape and of sufficient length to always cover the opening 38. This shutter element 40 is mounted on an arm 41 pivoted to swing about the same center 33 as the indicating arm 32, but is so mounted as to be movable independently of the arm 32. This shutter is provided with a slot 42 movable over the opening 38. The upper movement of this shutter is limited by the stop 43 which is so arranged that when the shutter is in its upper position the slot 42 is just within the upper edge of the opening 38, as shown in Fig. 2. The lower movement of the shutter is limited by the stop 44 and this is arranged so that when the shutter is in its lower position the slot 42 is just above the lower edge of the slot or opening 38. Movements of the indicating arm 32 are limited by the upper and lower stops 45 and 46, which are so located that when in its upper position the head 37 covers the slot 42 in the shutter 40 when the shutter is in its upper position, as shown in Fig. 2, and when the head 37 is in its lowest position it will cover the slot 42 when the shutter is in its lowest position.

The shutter arm 41 is extended beyond the pivot 33 to the opposite side thereof providing a tailpiece 47 which is also a movable electrical contact and is insulated from the remainder of the arm by the insulating barrier 48. This tail or contact 47 is adapted to move over and successively contact a series of spaced stationary contacts 49, 50, 51 and 52 of which adjacent contacts are spaced to correspond with one measuring unit, for a purpose which will later be more fully described. However, when the shutter 40 is in its upper position and therefore the tailpiece 47 is in its lower position, it does not engage any of these contacts but is spaced below the lowest contact 49, as shown in Fig. 2. This tailpiece 47 is connected at 53 to the solenoid plunger 54 so as to move with it, this plunger being operated by a slow moving solenoid 55, the plunger 54 including a head 56 operating in a dashpot 57 to cause slow and steady or uniform movement of the plunger. This plunger 54 carries a contact yoke comprising upper and lower insulated fingers 58 and 59 (Figs. 3, 5 and 8) which are spaced vertically from each other and are arranged to shift a spring contact 60 which is movable between upper and lower spaced contacts 61 and 62, and tends by its spring action to move to its intermediate position. The intermediate contact 60 is held against these respective contacts at certain times in the operation of the device by the permanent magnets 63 and 64, as will presently be more fully described, these magnets holding the contact 60 in engagement with the respective contacts 61 or 62, as the case may be, until it is positively shifted from the contact when it will spring into engagement with the other contact, thus giving a quick or snap action.

Figures 5, 6, 7:
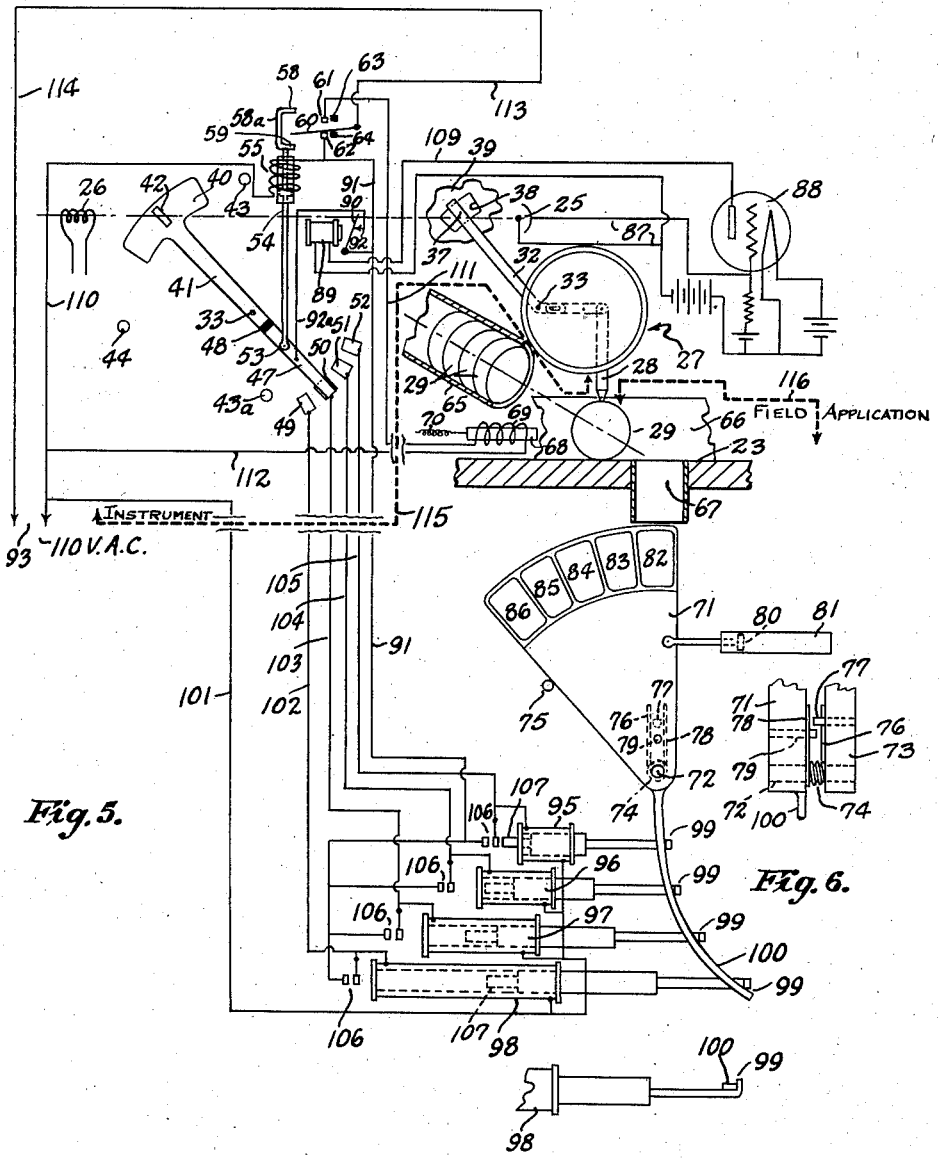
Fig. 5 is a wiring diagram showing the electrical connections and also showing diagrammatically certain elements of the gauging device.
Fig. 6 is a detail elevation of the mounting for the selector.
Fig. 7 is a side elevation of a portion of an operating means for the selector.

The wiring system and an example of a device to be controlled thereby is shown diagrammatically in Fig. 5. The example set up of the device shown is a sorting device for sorting out the elements being gauged according to size and depositing elements of the same size or sizes within predetermined limits in the same receptacle, but this is shown merely as an example as the device may be employed to control various devices, such for example as an indicating device, as either visible or audible indicating means, a suitable sorting or separating mechanism for the elements being gauged, as indicated, or any other desired means. The term "indicating means" is used in a broad sense as meaning any one of a number of different devices, such for example as a physical indicator, an audible signal, sorting means, adjusting means, and so forth, or any device affected or controlled by the reaction of a light-sensitive cell due to interruption or change of the light beam.

As shown in Fig. 5, means is provided for automatically feeding a series of round elements (for example) 29, to the gauging position under the gauging stem 28, and then ejecting the individual elements into the proper trough or bin depending on the dimensions of the elements. This comprises a hopper chute 65 leading from any suitable hopper (not shown) and adapted to hold a plurality of elements to be gauged, which are fed one at a time under the gauging stem 28.

This may be accomplished by spacing the outlet end of the tube 65 from an upright back 66 for the gauge bed 23 a distance so that there is room only for one element to leave the tube at a time. Beyond the gauging position the bed 23 is provided with a discharge slot 67 for the pieces after they have been gauged and to which they are shifted from the gauging position after being gauged by an automatic device which in the layout shown comprises a plunger 68 operated by the solenoid 69 at the proper time, as will be described later, the plunger being returned to and held in the retracted position by a spring 70. Associated with the discharge slot 67 and located beneath it is a selector device comprising a sector 71 pivoted at 72 on a suitable supporting base or plate 73, and a spring 74 tends to hold the sector in its normal or retracted position shown against the limit stop 75 and to return it to this position after it has been shifted in the sorting operation. The spring 74 may be coiled about the pivot 72, one free arm 76 engaging a pin or abutment 77 on the support 73 and the other arm 78 engaging a similar pin or abutment 79 on the sector, the sector being controlled against too rapid movement by a plunger 80 connected thereto operating in a dashpot 81. The sector 71 is provided with any desired number of openings 82 to 86 adapted to be shifted to positions under the discharge slot 67 and themselves forming entrances to a plurality of chutes (not shown) leading to a series of containers or bins (also not shown).

The photocell 25 is connected by wiring 87 to a suitable amplifier shown diagrammatically at 88 controlling a relay 89 the movable contact 90 of which is connected by wiring 91 with the stationary contact 62 and whose cooperating stationary contact 92 is connected by wire 92a with the tailpiece 47 of the scanning shutter. A source of electric current is indicated at 93 which may be represented by an attachment plug cap 94 (Fig. 1) which may be plugged into any suitable outlet receptacle in a shop or factory.

The sector 71 is shifted to various positions according to the measurements of the part or element being gauged by means of a series of solenoids 95, 96, 97 and 98, the plunger of each of which is connected by a hook 99 with an extension or arm 100 connected with the sector 71. Each hook, however, is so arranged that although it may shift the arm 100 in one direction (to the left as viewed in Fig. 5) to swing the sector 71 about its pivot, it will permit movement of the arm in that direction independent of the hook so that the arm may be so shifted by any one of the solenoids independently of the other solenoids. As will be seen from Fig. 5, these solenoids are of different lengths and impart different throws or distance of movement to their respective plungers to position the various openings 83, 84, 85 and 86 under the discharge slot 67. Thus when the solenoid 95 is energized, it will swing the sector 71 to position the opening 83 in alignment with the slot 67. If solenoid 96 is energized it will shift the sector 71 to bring the opening 84 under the slot 67. Similarly solenoid 97 and 98 will shift the sector 71 to bring the openings 85 and 86 respectively into alignment with the slot 67. Also the solenoids 95 to 98 are each connected by the lead 101 with one side of the current supply 93, while the other end of each solenoid is connected with one of the stationary contacts 49, 50, 51 and 52 by the leads 102, 103, 104 and 105 respectively.

Auxiliary normally open contacts or switches 106 are associated with each solenoid 95 to 98 in position including a movable spring contact to be closed by the solenoid plunger when this plunger is shifted to its extreme inward or lefthand position, by means of an extension 107 on each plunger, to provide a sustaining circuit to maintain the current through the solenoid if the relay contacts 90 and 92 are opened by energization of the relay 89, one of each of these contacts 106 being connected to the lead 91 connected to contact 62, and the other connected with the leads 102, 103, 104 and 105 for the respective solenoids. The ejector solenoid 69 for the article being gauged is connected at one end by a lead 111 to the contact 61 controlled by the yoke 58a and at its other end by lead 112 to one side of the source of power. The movable contact 60 is connected by lead 113 to the other side 114 of the source of power.

The heavy dotted lines 115 and 116 in Fig. 5 are drawn to indicate the line of demarcation between the parts or elements which are mounted in the assembled unit or instrument, that is, are within the housing assembly, while the elements below these lines indicate a field application outside of the instrument itself and to which the instrument may be readily connected, as for example by the plug-in cap 117 (Fig. 1) to which the leads 101 to 105 inclusive and 91, 111 and 112 are connected and each to one of the series of prongs 118. This cap is adapted to be inserted in a complementary attaching element or receptacle having a socket contact for each prong to continue the connection of these leads to the various solenoids and other operative elements in the sorting device, only a part of the prongs on the detachable connections being shown in Fig. 1 as they are not ordinarily arranged in a straight line but on a round body. This detachable connection is indicated in Fig. 5 by the break in the leads at the dotted lines 115 and 116.

Figure 3:
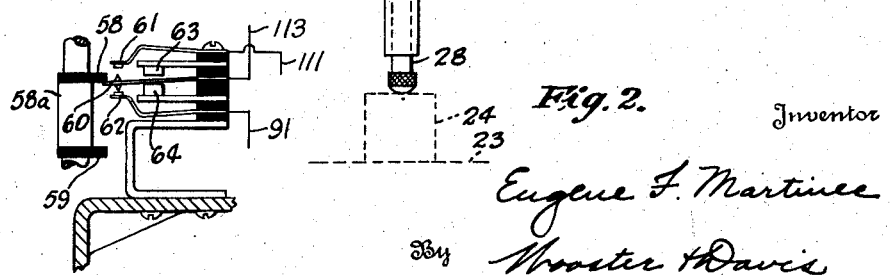
Fig. 3 is an elevation of a portion of the control means looking from the right of Fig. 2.
Figure 4:
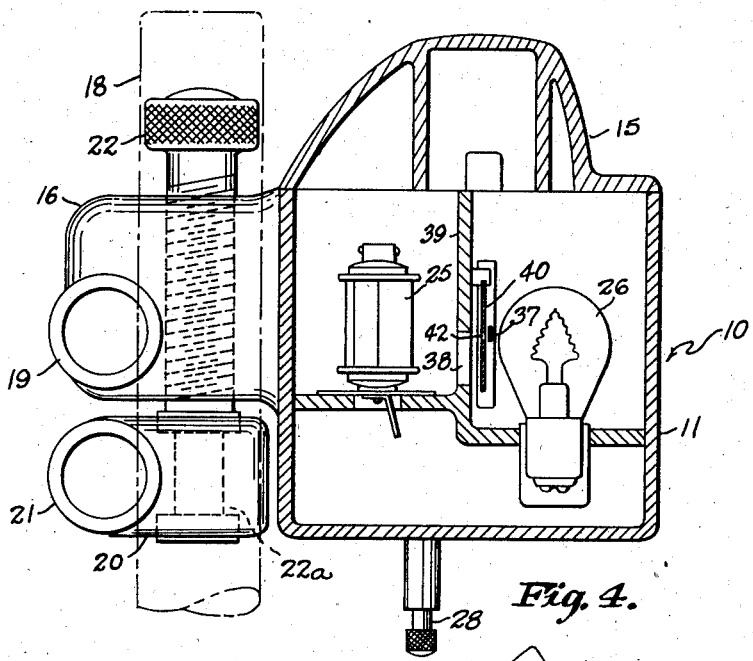
Fig. 4 is a partial vertical section and partial elevation, the section being substantially on line 4—4 of Fig. 1.

Operation is as follows:

As previously indicated, one part or element 29 only drops from the feed or hopper chute 65 to the gauging position under the stem 28. This positions the indicating arm 32 and more particularly the tip or head 37 of this arm in a given position depending on the measurements of the piece 29 being gauged. Normally with no current flowing through the slow-acting solenoid 55 the solenoid plunger 54 together with the contact yoke 58a, and the tailpiece 47 of the shutter arm, are caused by gravity to drop to or assume their lowermost position with the tailpiece 47 against the limit stop 43a or the shutter against a similar stop 43. In this position the tailpiece 47 is below and out of engagement with the first or lowest stationary contact 49, as shown in Fig. 2. When voltage is applied at the source 93 the solenoid 55 is energized, the current flowing through the contact 62, the movable spring contact 60 and the leads 113 and 114 completing the circuit. As the tailpiece and the contact yoke 58a are in their extreme low position, the upper finger 58 of the yoke is in position where it engages the contact 60, as shown in Fig. 3, and depresses it so that it is in engagement with the contact 62. The slow-acting solenoid 55 now begins to slowly pull up the tailpiece 47 of the shutter arm and this action continues until the bottom arm 59 of the contact yoke 58a engages the spring contact 60 and pushes it away from engagement with contact 62 and causes it to engage the upper contact 61. The spring contact 60 has remained in engagement with the contact 62 during upward movement of the yoke 58a because of the permanent magnet 64 which has held it in engagement with contact 62 and therefore the circuit is broken only when the lower finger 59 engages the contact 60 and shifts it upwardly. The movement of the contact 60 from contact 62 to contact 61 occurs instantaneously with a snap action because of the permanent magnets so that there is no dead time.

As a part 29 to be gauged was under the gauging stem 28 before the solenoid 55 started to draw the tailpiece 47 of the shutter arm upwardly, the indicating arm tip has assumed a measuring position depending on the size of the part being gauged and as the scanning shutter 40 moves downwardly the slot 42 in this shutter passes behind the tip 37 interrupting the light beam which has been passing from the light source 26 through the slot 42 and opening 36 to the photocell element 25, causing a signal to be transmitted to the amplifier 88 through the wiring 87. This photocell amplifier caused the contacts 90 and 92 of the relay 89 to be closed during the time that the light beam is interrupted by the tip 37 of the indicator arm. The closing of these contacts on the relay caused any one of the solenoids 95, 96, 97 and 98 to operate depending on what contact 49, 50, 51 or 52 the tailpiece or contact 47 of the shutter arm happened to be on when the light beam was interrupted. As these contacts 49 to 52 are spaced one measuring unit apart as related to one measuring unit shown by the indicating arm 32, each contact represents a difference of one measuring unit in the size of the part 29 being gauged. Each solenoid 95 to 98 will shift the sector 71 to position the proper opening 83 to 86 under the discharge slot 67 in the gauge plate 23 through which the part 29 being gauged is eventually ejected by movement of the plunger 68 when the solenoid 69 is energized by shifting of the contact 60 to engagement with the contact 61 as the yoke 58a reaches its uppermost position. That is, if as shown in Fig. 5 the tailpiece contact 47 is in engagement with the stationary contact 50 when the light beam is interrupted, the solenoid 97 will be energized and will shift the sector 71 to bring the opening 85 and the corresponding chute (not shown) leading therefrom, into position under and in alignment with the discharge slot 67.

While the solenoid 55 was swinging the shutter arm and drawing the tailpiece contact 47 upwardly, and one of the solenoids (in the example taken, the solenoid 97) was energized and shifted the trough selector 71 as indicated into the correct position, the selector was retained in this position even after the tailpiece contact 47 left the contact 50 for this solenoid, because when the solenoid plunger was shifted, in spite of opening of the contacts of the relay 89, the extension 107 on the plunger of solenoid 97 when it reached the end of its movement closed the auxiliary contacts 106, shown at the left end of this solenoid. This maintains the circuit through this particular solenoid so that it remains energized and holds the selector trough 71 in the correct position until the yoke 58a shifts the contact 60 from the contact 62 at the end of its upward movement, to break the circuit. Then as above pointed out, as the contact 60 is shifted to engagement with the contact 61, the ejector solenoid 69 is energized causing the plunger 68 to shift the piece 29 being gauged from its position under the gauging stem 28 to the slot 67 through which it drops and into the proper opening in the selector 71, in the example described the opening 85, which has been positioned under and in alignment with this slot, and it will be carried by the chute (not shown) leading from this opening 85 to the correct compartment or bin for the parts having this particular dimension. It will be understood the same operation will result if during movement of the scanning shutter 40 the light beam is interrupted when the contact 47 is in engagement with some other one of the stationary contacts 49 to 52 to operate the corresponding solenoids 95 to 98 and shift and position the selector 71 to the corresponding position.

The breaking of the contact between the spring contact 60 and the contact 62 as the yoke 58a reaches the limit of its upward movement opens the circuit through the solenoid 55 causing the solenoid to be de-energized and it therefore allows the yoke 58a, plunger 54, and tailpiece 47 to move downwardly by gravity to its original lowermost position ready for operation in a new cycle for gauging a new part 29. As the yoke 58a moves downwardly and reaches its lowermost position, its upper finger 58 engages with contact 60 and pulls it away from the contact 61. This breaks the circuit through the ejector solenoid 69, allowing its plunger 68 to be retracted by the spring 70, allowing a new part 29 for the gauging operation to drop from the chute 65 into engaging position under the stem 28. When the contact 60 is shifted from the contact 62 as the yoke 58a reaches its uppermost position, it also breaks the circuit through the solenoid 95 to 98 which has been energized (in this case the solenoid 97) to shift the selector 71. This releases the selector 71 and the spring 74 tends to swing it to the left about its pivot 72 to its original position shown in Fig. 5. However, this movement is slowed up by the dashpot 81 to which the selector is connected so that the gauged part 29 which has been ejected from the gauging position by the plunger 68 to the discharge slot 67 has had time to fall into the correct opening in the selector 71, in the example described above the opening 85.

The selector 71 is so mounted that in its retracted or normal position, as shown in Fig. 5, the opening 82 is directly under discharge slot 67. This is the position in which none of the solenoids 95 to 98 are energized. If any one of the solenoids is energized the selector is shifted to bring the corresponding opening under and in alignment with slot 67.

Figure 8:
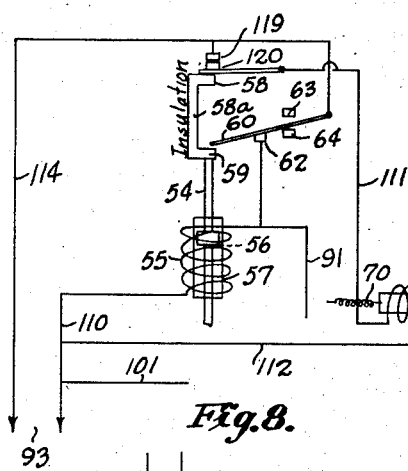
Fig. 8 is a part of the electrical diagram showing a somewhat modified arrangement.

It will be understood that other certain arrangements can be used for performing various or similar operations noted. For example, the dashpot arrangement 81 can be eliminated from the selector 71 and instead the ejecting solenoid 69 can be energized momentarily by the closing of two contacts just before the yoke 58a breaks contact between the spring contact 60 and the contact 62. This arrangement is shown in Fig. 8, in which it will be seen the upper contact 61, shown in Fig. 5, has been eliminated and another contact 119 provided connected with one side 114 of the source of power, and a movable contact 120 connected by lead 111 with the solenoid. With this arrangement it will be seen that just before the yoke 58a shifts the contact 60 to break the circuit through the slow-acting solenoid 55, the contact 120 is shifted to engage the contact 119 to energize the solenoid 69 and thus operate its plunger 68 to shift the gauged piece from the gauging position to the discharge opening 67.

Figure 10:
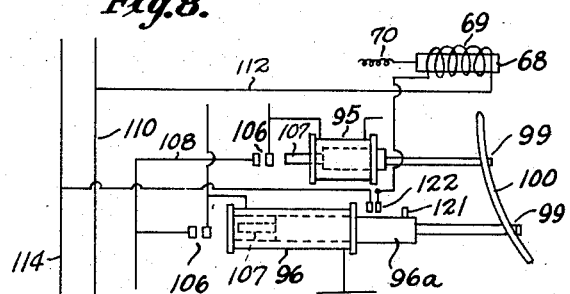
Fig. 10 is a diagrammatical view of the selector operating means showing a slight modification.

Or if preferred the particular solenoid 95 to 98 which has been energized to shift the selector 71 could be used to shift a contact to close the circuit through the ejector solenoid 69. Such an arrangement is shown in Fig. 10, the device, however, being shown with one solenoid only. Thus the plunger of the solenoid 96 is provided with a lug 121 so arranged that as the plunger 96a of the solenoid reaches the end of its movement it will shift the contact 122 of a suitably placed switch to close the circuit through the ejector solenoid 69 to eject the gauged piece, as indicated. A similar arrangement would of course be applied to each solenoid 95 to 98 to thus eject the gauged piece at the proper time.

It will be understood from the above description that after the power is once turned on to the device from the source 93 the action of the gauging, feeding, ejecting and sorting operations is entirely automatic and all that is necessary is for the operator to keep the hopper supplying the feed tube 65 filled at all times with parts to be gauged. Any type of photocell amplifier, indicated diagrammatically at 88, controlling the relay 89, may be used with this arrangement.

The width of the movable contact tail piece 47 is somewhat greater than the spacing between the stationary contacts 49 to 52, so that during movement of this contact tailpiece it will always be in engagement with at least one of the contacts 49 to 52. If due to the size of the piece 29 being gauged, this tailpiece 47 should bridge two of the stationary contacts at the time the slot 42 in the scanning shutter passes the tip 37 of the indicator arm to interrupt the light beam, then two of the positioning solenoids 95 to 98 would become energized. In this case, due to the novel arrangement shown for the linkage between the solenoids 95 to 98 and the selector 71 this selector would be positioned with its opening 83 to 86 under the discharge slot 67 corresponding to the highest numbered solenoid energized. For example, if a piece measuring one and one-half measuring units over the basic size is being gauged it would be sorted into the sorting compartment or opening of the selector 71 which normally takes a piece measuring two units over the basic size. That is, because the contact 47 would bridge the two contacts both corresponding to one and two units over the basic size, as described, the selector 71 would be shifted to correspond with the larger or two units over the basic size solenoid. In other words, if a part being gauged is any part over one-half of a measuring unit over a particular size, it will be sorted into the next higher size of compartment.

It will be seen from Fig. 5 that each individual solenoid 95 to 98 has a plunger with a different length of stroke than that of each of the other solenoids, the stroke of each being such that when the stroke is completed the correct opening 83 to 86 for that particular solenoid is in position under the described opening 67. If two solenoids, as explained above, happen to become energized at the same time because the movable contact 47 bridges two stationary contacts 49 to 52, the solenoid with the longer stroke governs the position of the selector 71 because of the one-way hook arrangement 99 which connects each solenoid with the arm 100 on the selector. That is, with this hook arrangement any solenoid 95 to 98 may be energized and its plunger shifted to shift the arm 100 and swing the selector 71 independently of each of the other plungers, and therefore this hook arrangement would permit the plunger with the longer stroke to complete its movement after the movement of the plunger with the shorter stroke had been completed. Thus, for example, if the two solenoids 96 and 97 are energized the plungers of both of these solenoids will be shifted, but as the stroke of the plunger of the solenoid 97 is longer than that of the plunger of the solenoid 96, although they are both moved together during movement of the plunger of the solenoid 96, after the movement of this plunger has been completed the plunger of the solenoid 97 will continue its movement to the end of its stroke, drawing the arm 100 away from the hook 99 on the plunger of the solenoid 96. This arrangement also permits any individual solenoid to operate to swing the selector when energized without affecting any of the other solenoids.

Figure 9:
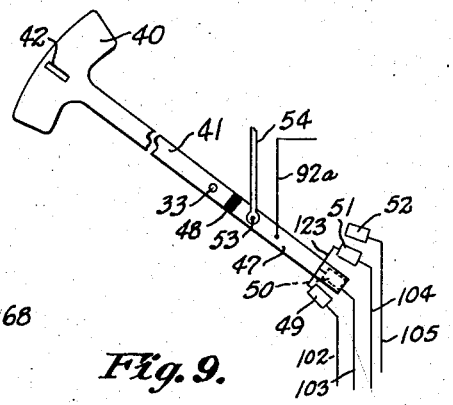
Fig. 9 is a view of the shutter and electrical connections showing another modified arrangement.

Because of this arrangement of operating connections, if it should be desired to have all the gauged pieces within certain tolerances deposited in one sorting bin or compartment and eject all the smaller ones into another bin or compartment, and all those oversize into yet another bin or compartment, this can be readily arranged. Let it be assumed, for example, it is desired to accept into one bin all pieces of a given size, plus those that vary plus or minus one measuring unit from this basic size, the procedure would then be as follows: The gauging element 27 would be set by adjusting micrometer screw 22 so that the tip 37 of the gauging arm would be in line with the slot 42 in the scanning shutter when the tailpiece contact 47 on the scanning arm engages the second contact 50 from the bottom, as shown in Fig. 9. This contact and the contact 51 immediately above it and the contact 49 immediately below it are connected with each other and the contact 50 by a simple link or bridging connection 123, so that when the tail contact 47 rests on any one of these three contacts the three solenoids (in this case the solenoid 96, 97 and 98) will be energized. However, the solenoid having the longest stroke, that is the solenoid 98, will be the one that determines the position of the selector 71 and the opening therein which will be in alignment with the discharge opening 67 (in this case the opening 86) and therefore determines the bin or compartment into which the gauged part will fall. Consequently, all pieces being gauged that are within plus or minus one measuring unit of the basic size represented by the contact 50 will fall into the same bin. If the piece being gauged is one unit too large the indicator 37 will be shifted up to a point where the tail piece 47 is below contact point 49 and therefore none of the solenoids 95 to 98 will be energized when the light beam is interrupted and therefore selector 71 will not be shifted and the part will be discharged through the opening 82, which will normally be under the opening 67. Similarly, if the part being gauged is one unit too small the piece being gauged will position the stem 29 to the point where the indicating arm 32 is just ready to lift the tip 37 of the indicator arm off stop pin 46 so that the light beam is interrupted when the tail piece contact 4 is in engagement with upper contact 52. This will then energize the solenoid 95 to shift the selector 71 to bring the opening 83 under the discharge opening 6. Thus all these small pieces will be discharged into the bin or compartment controlled by this opening 83.

It is to be understood that any desired number of contacts 49 to 52 may be used, four being shown merely by way of example, as well as any reasonable travel of indicating arm 32 and scanning shutter arm 41, so that parts varying considerably in size can be handled, and that by electrically connecting together different combinations of these contacts 49 to 52 any segregation of parts varying within certain limits can be obtained. It is also to be understood that the drawings are schematic drawings showing the operating functions of various parts and that there is practically no limit as to how the various fundamental parts can be grouped or arranged mechanically, electrically or physically without departing from the scope of the invention.

It is contemplated that in the actual gauge, selecting contacts 49 to 52 will be connected to binding posts or other simple devices for making electrical connections, so that any other equipment than the selector 71 shown in these drawings may be utilized and operated by circuits which are determined by the size of the piece being gauged. For example, the wires leading from contacts 49 to 52 could be connected to various types of signals or to control adjusting means for machine tools producing the parts being gauged.

It will be clear from the above that this unit can be used for counting the number of measuring units that a part being gauged varies from some given size; that it can be used to sort them, and it can be used to accept parts having certain tolerances or give any type of signal based on the size of the part being gauged, as well as being capable of use to translate through various means adjustments to the machine producing or operating on the parts being gauged and which adjustments are dependent on the size of the gauged part. It will also be seen this unit utilizes a simple indicating arm or pointer without any material increase in weight, without the necessity of widening the tip of the arm. This is very desirable as any unnecessary weight added to the arm, epecially at the tip thereof, increases its inertia, causing excessive wear on the gauging mechanism and slowing down the gauging time. By the use of the scanning shutter movable independently of the indicating arm, sufficient time is allowed for high inertia translating equipment to operate. The correct circuit for connection to the translating equipment depending on the size of the part being gauged, is selected directly by this shutter arm itself so that no extra stepping or selecting switch is necessary. All electrical circuits for controlling the various operations of the unit are either controlled by the shutter arm or operated directly by it, permitting the use of various simple inexpensive and accurate equipment. With this construction it is possible to use a small sized self-contained unit that is capable of selecting the correct circuit to energize translating equipment, said circuit depending on the size of the part being gauged, and may also provide means to energize automatic feeding and ejecting equipment so that the unit is entirely automatic and needs no attention with the exception of filling a feeding hopper with the parts to be gauged when necessary.

Although this device has been illustrated and described in a set-up for gauging a series of round elements, it is to be understood that this set-up has been given merely as one example of the large number of applications for which the device is adapted. In other words, it is not limited to the application specifically described and illustrated but may be employed for a large number of different applications and controls. Examples of these are shown in Figs. 8 to 12 inclusive of my copending application Serial No. 479,239, filed of even date herewith, now Patent No. 2,410,093, dated October 29, 1946. These figures with their descriptions give examples of various different applications in which the device may be used for controlling various devices and effects, and their description and illustration are not included in this application in order to simplify and reduce the amount of disclosure in the present case and avoid unnecessary repetition.

Having thus set forth the nature of my invention, what I claim is:

1. A gauging device comprising a photocell element, means for connecting said element with a device to be controlled, a light element positioned to provide a light beam to the cell element, means between the light and the cell to control the light beam comprising a scanning shutter and a movable member in overlapping relation and mounted for independent movement, said shutter and member being provided with cooperating means to control the light beam by relative movement between them, a contact movable with the shutter, a series of spaced contacts in position to be engaged by the movable contact, a plurality of circuits controlled by said contacts, a device controlled by said circuits to affect the element being gauged, means controlled by the cell controlled means for controlling said circuits, means positioned to be affected by the element being gauged and connected with the movable member to position said member, and means for causing movement of the shutter relative to the member to control the light beam and shift the movable contact over the stationary contacts to control the circuits connected therewith.

2. A gauging device comprising a photocell element, a relay controlled by said element, a light element positioned to provide a light beam to the cell element, a mechanical gauging element including a movable member located between the light and the cell and means positioned to be affected by the element being gauged and connected with the member to position said member, a scanning shutter in overlapping relation with said member and movable independently thereof, said shutter and member being provided with cooperating means to control the light beam, a plurality of selecting circuits, a plurality of spaced contacts connected one to each circuit, a contact movable with the shutter and by said movement to engage the first contacts in succession, means for shifting the shutter to control the light beam, and a connection from the relay to the movable contact to control the selecting circuits.

3. A gauging device comprising a photocell element, a relay controlled by said element, a light element positioned to provide a light beam to the cell element, a movable scanning shutter located between the light and the cell and provided with an opening for passage of said beam, a mechanical gauging element including a stem adapted to engage an element to be gauged and a movable member connected with the stem for location thereby, said member including a portion adapted to cover said opening in the shutter to interrupt the light beam, a plurality of spaced contacts, a movable contact connected with the shutter so as to move therewith and adapted by said movement to successively engage the stationary contacts, a selecting circuit connected with each stationary contact, a connection from the relay to the movable contact to control said circuits, and means for shifting the shutter and the movable contact to control said light beam and the circuits.

4. A gauging device comprising a photocell element, a relay controlled by said element, a light element positioned to provide a light beam to the cell element, a movable scanning shutter located between the light and the cell and provided with an opening for passage of said beam, a mechanical gauging element including a stem adapted to engage an element to be gauged and a movable member connected with the stem for location thereby, said member including a portion adapted to cover said opening in the shutter to interrupt the light beam, a contact connected with the shutter to move therewith, a switch controlled by the relay and electrically connected with said contact, a plurality of selecting circuits arranged to be controlled in succession by movement of said contact, and means for shifting the shutter to control said light beam and at the same time shifting said contact to control said circuits.

5. A gauging device comprising a housing, means for adjustably mounting the housing on an application locating support, a photocell element mounted in the housing, an amplifier mounted in the housing and connected with said cell, a relay controlled by the amplifier, a light element mounted in the housing and positioned to provide a light beam to the cell element, a mechanical gauging element mounted in the housing including a gauging stem projecting from the housing in position to engage an element being gauged and a movable member connected to said stem to be operated thereby, said member extending to a position between the light and cell, a plurality of stationary contacts in the housing, means for connecting said contacts to a plurality of circuits, a movable contact in the housing adapted to engage the stationary contacts in succession, a switch controlled by the relay and connected to the movable contact to control said circuits, control means connected with the movable contact to move therewith and adapted to cooperate with the movable member to control the light beam, and means for shifting said contact and control means to control the light beam and said circuits.

6. A gauging device comprising a housing, means for mounting the housing on an application locating support, a photocell element in the housing, a light element in the housing positioned to provide a light beam to the cell element, portions of a plurality of selecting circuits in the housing, means for connecting said portions to control means for operation by said circuits, a movable selecting means in the housing to select different circuits, a gauging element in the housing including a movable member positioned to be affected by the element being gauged and a second movable member connected with said first member to be positioned thereby, means movable with the selecting means adapted to cooperate with the second member to control the light beam, means controlled by the cell to control said selecting means, and means for shifting said selecting means.

7. A gauging device comprising a selector means including a movable member provided with a plurality of openings for receiving articles after they have been shifted from a gauging position and directing them to different containers, means for shifting said member to different positions to locate the respective openings in receiving position comprising a plurality of solenoids operating plungers with different lengths of stroke, means connecting each plunger to the selector member, a plurality of circuits connected with said solenoids, a mechanical gauging element including a movable member adapted to be positioned by an article in the gauging position and a second movable member connected with said first member to be positioned thereby, selecting means cooperating with said second member for energizing the respective circuits depending on the position of said member, and means for shifting the article from the gauging position to the selector.

8. A gauging device comprising a photocell element, a light element positioned to provide a light beam to the cell element, a plurality of selecting circuits, a movable selecting means adapted to select different circuits, a gauging element including a movable member positioned to be affected by an article in gauging position and a second movable member connected with said first member to be positioned thereby, means movable with the selecting means adapted to cooperate with said second member to control the light beam, means controlled by the cell to control said selecting means, means for shifting the selecting means, a solenoid controlled by each circuit, plungers operated by the respective solenoids having different lengths of travel, a selector including a movable member adapted to receive the article after it is shifted from the gauging position and direct it to any one of a plurality of different containers, means connecting the plungers with said selector member to position it in the different positions, and means for shifting the article from the gauging position to the selector.

9. A gauging device comprising a photocell element, a relay controlled by said element, a light element positioned to provide a light beam to the cell element, a movable scanning shutter located between the light and the cell and provided with an opening for passage of said beam, a mechanical gauging element including a stem adapted to engage an element to be gauged and a movable member connected with the stem for location thereby, said member including a portion adapted to cover said opening in the shutter to interrupt the light beam, means for feeding articles to be gauged to a position under said stem and to shift the gauged articles from the gauging position, a plurality of spaced contacts, a movable contact connected with the shutter to move therewith and adapted to successively engage the stationary contacts, a selecting circuit connected with each stationary contact, a connection from the relay to the movable contact to control said circuits, a movable selector provided with a series of openings adapted to be positioned to receive the gauged articles after they leave the gauging position and direct them to different compartments, a solenoid in each selecting circuit operating plungers connected to the selector, the said individual plungers being arranged to shift the selector different amounts to place different openings in an article receiving position, and means for shifting the shutter and the movable contact to control the light beam and the circuits.

10. A gauging device comprising a photocell element, a relay controlled by said element, a light element positioned to provide a light beam to the cell element, a mechanical gauging element including a movable member located between the light and the cell and a second movable member positioned to be affected by the element being gauged and connected with the first member to position said member, a scanning shutter in overlapping relation with said first member and movable independently thereof, said shutter and first member being provided with cooperating means to control the light beam, a plurality of selecting circuits, means movable with the shutter for controlling said circuits, means controlled by the relay for controlling the operation of said latter means, a movable selector provided with a series of openings adapted to be positioned to receive the gauged articles after they leave the gauging position and direct them to different compartments, means controlled by each circuit for shifting the selector and each arranged to shift said selector a different amount so as to position the different openings in article receiving position, means for shifting the shutter and movable means to control the light beam and said circuits, and means for shifting the gauged articles from the gauging position to the selector.

11. A gauging device comprising a photocell element, a light element positioned to provide a light beam to the cell element, a mechanical gauging element including a movable member and a second movable member positioned to be affected by the element being gauged and connected with the first member to position the member, a scanning shutter in overlapping relation with said first member and movable independently thereof, said shutter and first member being located between the light and the cell and provided with cooperating means to control the light beam, a plurality of selecting circuits, means movable with the shutter for controlling said circuits, means controlled by the cell element connected with said movable means to control the effect thereof, a movable selector member adapted to be positioned to receive articles after they are shifted from the gauging position and direct them to different compartments, a solenoid in each selecting circuit including a movable plunger, each plunger being arranged to have a different movement from the other plungers, a one-way connection from each plunger to the selector arranged to permit operation of the selector by each plunger independently of the other plungers, means for controlling movement of the shutter and said movable means to control the light beam and said circuits, and means for shifting the gauged articles from the gauging position to the selector.

12. A gauging device comprising a photocell element, a light element positioned to provide a light beam to the cell element, a mechanical gauging element including a movable member and a second movable member positioned to be affected by the element being gauged and connected with the first member to position said member, a scanning shutter in overlapping relation with said first member and movable independently thereof, said shutter and first member being located between the light and the cell and provided with cooperating means to control the light beam, a plurality of selecting circuits, a movable selector provided with a plurality of openings adapted to be positioned to receive the gauged articles after they leave the gauging position and direct them to different compartments, means operated by each circuit to shift the selector and each arranged to shift said selector a different amount from those of the other circuits to locate the respective openings in article receiving position, a selecting means movable with the shutter to select different circuits, means controlled by the cell element to control said selecting means, means to control movement of the shutter and selecting means, and means to shift the gauged articles from the gauging position to the selector.

13. A gauging device comprising a photocell element, a light element positioned to provide a light beam to the cell element, a plurality of selecting circuits, a movable selector provided with a series of openings adapted to be positioned to receive gauged articles after they are shifted from gauging position and direct them to different compartments, means operated by each circuit for shifting the selector and each arranged to shift the selector a different amount from each of the other circuits and independently thereof to locate the respective openings in article receiving position, a movable selecting means adapted to select different circuits, a gauging element including a movable member positioned to be affected by the article being gauged and a second movable member connected with said first member to be positioned thereby, means movable with the selecting means adapted to cooperate with the second member to control the light beam, means controlled by the cell to control said selecting means, means for shifting the selecting means, and means for shifting the gauged articles from the gauging position to the selector.

14. A gauging device comprising a photocell element, a relay controlled by said element, a light element positioned to provide a light beam to the cell element, a mechanical gauging element including a movable member located between the light and the cell and means positioned to be affected by the element being gauged and connected with the member to position said member, a scanning member in overlapping relation with said first member and movable independently thereof, said members being provided with cooperating means to control the light beam, a plurality of selecting circuits, means movable with one of said members for controlling said circuits, means controlled by the relay for controlling the operation of said latter means, and means for shifting the scanning member after the movable member has been positioned by the positioning means to control the light beam and said circuits.

15. A gauging device comprising a photocell element, a relay controlled by said element, a light element positioned to provide a light beam to the cell element, a mechanical gauging element including a movable member located between the light and the cell and means positioned to be affected by the element being gauged and connected with the member to position said member, a scanning shutter in overlapping relation with said member and movable independently thereof, said shutter and member being provided with cooperating means to control the light beam, a plurality of selecting circuits, means movable with the shutter for controlling said circuits, means controlled by the relay for controlling the operation of said latter means, a solenoid including a slow acting plunger connected with the shutter for controlling movement thereof and movement of said movable means, a switch to control said solenoid, and means movable with said plunger to control said switch.

16. A gauging device comprising a photocell element, a light element positioned to provide a light beam to the cell element, a mechanical gauging element including a movable member and means arranged to be affected by the element being gauged and connected with the member to position the member, a scanning shutter in overlapping relation with said member and movable independently thereof, said shutter and member being located between the light and the cell and provided with cooperating means to control the light beam, a plurality of selecting circuits, means movable with the shutter for controlling said circuits, means controlled by the cell element connected with said movable means to control the effect thereof, and means for controlling movement of the shutter and said movable means to control the light beam and said circuits.

17. A gauging device comprising a photocell element, a light element positioned to provide a light beam to the cell element, a mechanical gauging element including a movable member and means positioned to be affected by the element being gauged and connected with the member to position the member, a scanning shutter in overlapping relation with said member and movable independently thereof, said shutter being provided with an opening for passage of the light beam, said member including a portion adapted to cover said opening to interrupt the light beam, a plurality of selecting circuits, means movable with the shutter for controlling said circuits, means controlled by the cell element connected with said movable means to control the effect thereof, and means for controlling movement of the shutter and said movable means to control the light beam and said circuits.

18. A gauging device comprising a photocell element, a light element positioned to provide a light beam to the cell element, a mechanical gauging element including a movable member and means positioned to be affected by the element being gauged and connected with the member to position the member, a scanning shutter in overlapping relation with said member and movable independently thereof, said shutter and member being located between the light and the cell and provided with cooperating means to control the light beam, selecting means movable with the shutter, means controlled by the cell element connected with the selecting means to control the effect thereof, and means for controlling movement of the shutter and selecting means to control the light beam and the effect of said means.

19. A gauging device comprising a photocell element, a light element positioned to provide a light beam to the cell element, a mechanical gauging element including a movable member and means positioned to be affected by the element being gauged and connected with the member to position the member, a scanning shutter in overlapping relation with said member and movable independently thereof, said shutter and member being located between the light and the cell and provided with cooperating means to control the light beam, a plurality of selecting circuits, control means operated by each circuit, a selecting means movable with the shutter to select different circuits, means controlled by the cell element to control said selecting means, and means to control movement of the shutter and the selecting means.

20. A gauging device comprising a photocell element, a light element positioned to provide a light beam to the cell element, a plurality of selecting circuits controlled by the cell element, control means operated by each circuit, a movable selecting means adapted to select different circuits, a gauging element including a movable member positioned to be affected by the element being gauged and a second movable member connected with said first member to be positioned thereby, means movable with the selecting means adapted by its movement to cooperate with said second member to control the light beam, means controlled by the cell to control said selecting means, and means for shifting the selecting means.

21. A gauging device comprising a photocell element, a light element positioned to provide a light beam to the cell element, a plurality of selecting circuits, control means operated by each circuit, a movable selecting means adapted to select different circuits, a gauging element including means positioned to be affected by the element being gauged and a movable member connected with said means to be positioned thereby, scanning means movable with the selecting means adapted to cooperate with the movable member to control the light beam, means controlled by the cell to control the selecting means, a solenoid having a slow acting plunger connected with the selecting means for shifting it, a switch for controlling the solenoid, and means movable with the plunger for operating said switch.

22. A gauging device comprising a movable selector member adapted to be positioned for directing articles to any one of a plurality of different containers, a gauging means including a movable member adapted to be positioned by an article in gauging position and a second movable member connected with said first member to be positioned thereby, means for shifting the selector member to position it in article directing position, means cooperating with said second movable member and connected with said selector shifting means to position the selector member according to the position of said second member, and means controlled by said cooperating means for shifting the article being gauged to the selector member after it is so positioned.

23. A gauging device comprising a selector means including a movable selector member adapted for directing articles to any of a plurality of different containers and adapted to receive an article after it is shifted from the gauging position, a mechanical gauging element including a movable member adapted to be positioned by an article in the gauging position and a second movable member connected with said first member to be positioned thereby, a plurality of selecting circuits, means controlled by each circuit for shifting the selector member to a given position, a selecting means for selecting the different circuits for operation of the selector member, means cooperating with the second member for controlling the operation of said selecting means, and means controlled by said cooperating means for shifting the article being gauged from the gauging position to the selector member.

24. A gauging device comprising a photocell element, a relay controlled by said element, a light element positioned to provide a light beam to the cell element, a movable scanning shutter located between the light and the cell and provided with an opening for passage of said beam, a mechanical gauging element including a stem adapted to engage an element to be gauged and a movable member connected with the stem for location thereby, said member including a portion adapted to cover said opening in the shutter to interrupt the light beam, means for feeding articles to be gauged to a position under said stem and to shift the gauged articles from the gauging position, a plurality of spaced contacts, a movable contact connected with the shutter to move therewith and adapted to successively engage the stationary contacts, a selecting circuit connected with each stationary contact, a connection from the relay to the movable contact to control said circuits, a movable selector member adapted to receive the gauged articles after they leave the gauging position and be positioned to direct them to different compartments, a solenoid in each selecting circuit operating plungers connected to the selector, the said individual plungers being arranged to shift the selector member different amounts, and means for shifting the shutter and the movable contact to control the light beam and the circuits.

25. A gauging device comprising a photocell element, a relay controlled by said element, a light element positioned to provide a light beam to the cell element, a movable scanning member located between the light and the cell and provided with an opening for passage of said beam, a mechanical gauging element including a stem adapted to engage an element to be gauged and a movable member connected with the stem for location thereby, said movable member including a portion adapted to cover said opening in the scanning member to interrupt the light beam, means for feeding articles to be gauged to a position under said stem and to shift the gauged articles from the gauging position, a plurality of spaced contacts, a movable contact connected with one of said members to move therewith and adapted to successively engage the stationary contacts, a selector circuit connected with each stationary contact, a connection from the relay to the movable contact to control said circuits, a movable selector member adapted to receive the gauged articles after they leave the gauging position and be positioned to direct them to different compartments, a solenoid in each selecting circuit operating plungers connected to the selector, the said individual plungers being arranged to shift the selector member different amounts, and means for shifting the shutter and the movable contact to control the light beam and the circuits.

26. A gauging device comprising a photocell element, a relay controlled by said element, a light element positioned to provide a light beam to the cell element, a mechanical gauging element including a movable member located between the light and the cell and means positioned to be affected by the element being gauged and connected with said member to position the member, a scanning member in overlapping relation with said first member and movable independently thereof, said scanning member and first member being provided with cooperating means to control the light beam, a plurality of selecting circuits, means movable with one of said members for controlling said circuits, means controlled by the relay for controlling the operation of said latter means, a movable selector adapted to be positioned to receive the gauged articles after they leave the gauging position and direct them to different compartments, means controlled by each circuit for shifting the selector and each arranged to shift said selector a different amount, means for causing relative movement between the scanning member and the movable member to control the light beam and said circuits, and means for shifting the gauged articles from the gauging position to the selector.

27. A gauging device comprising a photocell element, means for connecting said element with a device to be controlled, a light element positioned to provide a light beam to the cell element, means between the light and the cell to control the light beam comprising a scanning member and a movable member in overlapping relation and mounted for independent movement, said members being provided with cooperating means to control the light beam by relative movement between them, a contact movable with one of said members, a series of spaced contacts in position to be engaged by the movable contact, a plurality of circuits controlled by said contacts a device controlled by said circuits to affect the element being gauged, means controlled by the cell controlled means for controlling said circuits, means positioned to be affected by the element being gauged and connected with the movable member to position said member, and means for causing movement of the scanning member relative to the movable member after it has been positioned by said positioning means to control the light beam.

28. A gauging device comprising a photocell element, a relay controlled by said element, a light element positioned to provide a light beam to the cell element, a mechanical gauging element including a movable member located between the light and the cell and means positioned to be affected by the element being gauged and connected with the movable member to position said member, a scanning member in overlapping relation with said movable member and movable independently thereof, said members being provided with cooperating means to control the light beam, a plurality of selecting circuits, a plurality of spaced contacts connected one to each circuit, a contact movable with one of said members and by said movement to engage the first contacts in succession, means for shifting the scanning member to control the light beam after the movable member has been positioned by said positioning means, and a connection from the relay to the movable contact to control the selecting circuits.

29. A gauging device comprising a photocell element, a relay controlled by said element, a light element positioned to provide a light beam to the cell element, a movable scanning member located between the light and the cell and provided with an opening for passage of said beam, a mechanical gauging element including a stem arranged to be affected by an element to be gauged, and a movable member connected with the stem for location thereby, said member including a portion adapted to cover said opening in the scanning member to interrupt the light beam, a plurality of spaced contacts, a movable contact connected with one of said members to move therewith and adapted by said movement to successively engage the stationary contacts, a selecting circuit connected with each stationary contact, a connection from the relay to the movable contact to control said circuits, and means for shifting the scanning member after the movable member has been positioned by the stem to control said light beam.

30. A gauging device comprising a photocell element, a light element positioned to provide a light beam to the cell element, a mechanical gauging element including a movable member and means arranged to be affected by the element being gauged and connected with the member to position said member, a scanning member in overlapping relation with said member and movable independently thereof, said members being located between the light beam and the cell and provided with cooperating means to control the light beam, a plurality of selecting circuits, means movable with one of said members for controlling the circuits, means controlled by the cell element connected with said movable means to control the effect thereof, and means for controlling movement of the scanning member to control the light beam.

31. A gauging device comprising a housing, means for mounting the housing on an application locating support, a photocell element in the housing, a light element in the housing positioned to provide a light beam to the cell element, portions of a plurality of selecting circuits in the housing, means for connecting said portions to control means for operation by said circuits, a movable selecting means in the housing to select different circuits, a gauging element in the housing including means arranged to be affected by the element being gauged and a movable member connected with said means to be positioned thereby, a scanning member mounted to move independently of the movable member, said members being provided with cooperating means to control the light beam, means for shifting the scanning member after the movable member has been positioned by the positioning means to control the light beam, means connecting said selecting means with one of said members and means controlled by the cell to control said selecting means.

EUGENE F. MARTINEC.

REFERENCES CITED

The following references are of record in the file of this patent:

UNITED STATES PATENTS

| Number | Name | Date |
|---|---|---|
| 1,690,171 | Kmentt | Nov. 6, 1928 |
| 655,553 | Heard | Aug. 7, 1900 |
| 1,758,268 | Wagner | May 13, 1930 |
| 2,307,572 | Cramer | Jan. 5, 1943 |
| 2,312,357 | Odquist | Mar. 2, 1943 |
| 2,319,833 | Troy | May 25, 1943 |
| 2,046,005 | Sprecker | June 30, 1936 |
| 1,854,760 | Paulson | Apr. 19, 1932 |
| 2,305,816 | Sonnberger | Dec. 22, 1942 |
| 2,344,596 | Carmina | Mar. 21, 1944 |

FOREIGN PATENTS

| Number | Country | Date |
|---|---|---|
| 843,506 | France | Mar. 27, 1939 |